US006650494B2

(12) United States Patent
Kim

(10) Patent No.: US 6,650,494 B2
(45) Date of Patent: Nov. 18, 2003

(54) MAGNETIC WRITE CIRCUIT WITH CHARGE PUMPING CAPACITORS

(75) Inventor: Jong K. Kim, Longmont, CO (US)

(73) Assignee: Agere Systems Inc., Allentown, PA (US)

( * ) Notice: Subject to any disclaimer, the term of this patent is extended or adjusted under 35 U.S.C. 154(b) by 354 days.

(21) Appl. No.: 09/877,332

(22) Filed: Jun. 8, 2001

(65) Prior Publication Data

US 2002/0186578 A1 Dec. 12, 2002

(51) Int. Cl.[7] .................................................. G11B 5/09
(52) U.S. Cl. ............................ 360/46; 360/68; 327/110
(58) Field of Search .............................. 360/68, 67, 66, 360/46; 327/494, 110, 111, 108, 109

(56) References Cited

U.S. PATENT DOCUMENTS 5,790,336 A * 8/1998 Voorman .................... 360/68
5,986,832 A * 11/1999 Barnett ........................ 360/46
6,052,017 A * 4/2000 Pidutti ........................ 327/424
6,128,146 A * 10/2000 Ngo ............................ 360/46
6,366,421 B2 * 4/2002 Teterud ...................... 360/68

* cited by examiner

*Primary Examiner*—Alan T. Faber
(74) *Attorney, Agent, or Firm*—Kinney & Lange, P.A.

(57) ABSTRACT

A disk drive system including a write circuit for controlling current through a magnetic write head includes an H-switch circuit and a charge-pumping circuit. The H-switch circuit controls direction of current through the magnetic write head. The charge-pumping circuit is connected to the H-switch circuit for storing energy during a first state of the H-switch circuit, and delivering energy upon switching from the first state to a second state of the H-switch circuit to accelerate a change in direction of current through the write head.

16 Claims, 3 Drawing Sheets

MAGNETIC WRITE CIRCUIT WITH CHARGE PUMPING CAPACITORS

BACKGROUND OF THE INVENTION

The present invention relates to a magnetizing current control circuit which operates with a magnetic recording head in a magnetic data storage and retrieval system. In particular, the present invention relates to a magnetizing current control circuit having a higher switching rate and reduced power dissipation.

In magnetic data storage and retrieval systems, a magnetic recording head records two-logic-state data in a magnetic data storage medium such as a magnetic tape or magnetic disc. The magnetic recording head has an inductive coil with currents provided therethrough in alternate directions representing the data, to impart a series of alternate magnetic field patterns over time to the magnetic medium moving by it. Producing alternate magnetic field patterns over time entails switching the electric current through the inductive coil between forward and reverse directions therethrough to correspond to the data. Current in the inductive coil generates a magnetic field oriented in a direction corresponding to the direction of flow through the coil; thus, reversing the direction of current reverses the orientation of the magnetic field. The magnetic fields generated by the inductive coil currents intersect the magnetic medium to polarize adjacent magnetic medium regions which in effect serve as data symbol storage positions on the medium, and so form magnetic patterns along a corresponding one of more or less concentric tracks in the medium from which an information signal can be retrieved.

Controlling the directions and magnitudes of currents through the inductive coil is the purpose of a magnetizing current control circuit. A typical magnetizing current control circuit includes a switching network and a signal coupler. The switching network is connected to the ends of the inductive coil in the magnetic recording head at first and second head nodes, and includes four switching transistors arranged as pairs with each pair member connected to a corresponding one of these head nodes. One pair is switched on directing current flow in one direction through the inductive coil with the other pair switched off and, alternatively, this latter pair is switched on to direct current flow through the inductive coil in the opposite direction with the first pair being switched off. More specifically, the switching transistors are connected to the inductive coil such that a first switching transistor is connected between a first voltage source node and the first head node, a second switching transistor is connected between the first voltage source node and the second head node, a third switching transistor is connected between the first head node and a second voltage source node, and a fourth switching transistor is connected between the second head node and the second voltage source node.

One principal concern in the performance of magnetizing current control circuits is the duration of time needed to complete a switching of current direction through the inductive coil which directly affects the switching rate. Switching rate, a measure of how often the magnetizing current control circuit can reverse current direction through the inductive coil per unit of time, determines the maximum linear spatial density of data along a track in the magnetic medium. Ultimately, a higher switching rate yields denser data storage and thus greater total data capacity for a magnetic medium.

A key determinant of the current reversal switching time duration is the head swing voltage, i.e. the voltage difference between the head nodes of the magnetizing current control circuit. The larger the voltage drop applied in the opposite direction across the inductive coil after a switching to reverse the current therethrough, the quicker the change in direction of current through the inductive coil. This is because the voltage-current characteristic of an inductive coil is determined by $V=L\,di/dt+R_L I$, where V is the voltage across the inductive coil, di/dt is the rate of change of current over time through the inductive coil, L is the inductance of the inductive coil, $R_L$ is the resistance of the inductive coil, and I is the current through the inductive coil. Because the inductance of the inductive coil is constant and the resistance of the inductive coil is relatively small, there is a direct relationship between the voltage impressed across the inductive coil after switching and the rate of change of current over time through the inductive coil.

In typical magnetizing current control circuits using MOS switching transistors, the head swing voltage is equal to the voltage difference between the drains of the first and second switching transistors. In order to create a large voltage difference between the drains of the first and second switching transistors after a switching to reverse the current through the inductive coil, a larger voltage difference must be provided between the voltage source nodes. This, however, typically requires the magnetizing current control circuit to be operated by a continuous high supply voltage, which in turn causes the circuit to have high power consumption.

Accordingly, there is a need for a magnetizing current control circuit that maximizes the head swing voltage while minimizing the power consumption of the circuit.

BRIEF SUMMARY OF THE INVENTION

The present invention is a disk drive system including a write circuit for controlling current through a magnetic write head. An H-switch circuit controls direction of current through the magnetic write head. A charge-pumping circuit is connected to the H-switch circuit for storing energy during a first state of the H-switch circuit, and delivering energy upon switching from the first state to a second state of the H-switch circuit to accelerate a change in direction of current through the write head.

DETAILED DESCRIPTION

Figure 1:
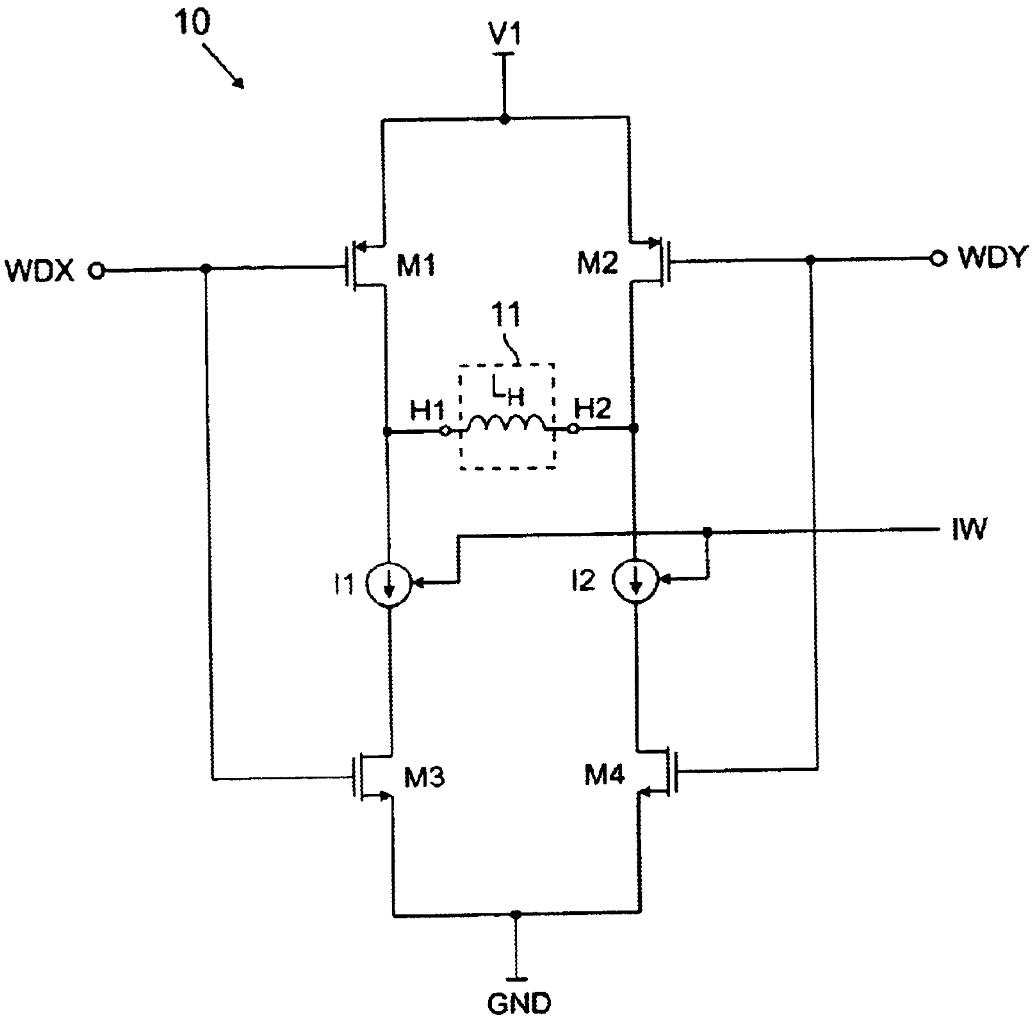
FIG. 1 shows a circuit schematic diagram of a prior art magnetic write circuit.

FIG. 1 shows a circuit schematic diagram of a prior art magnetic write circuit 10. Prior art magnetic write circuit 10 is part of a disk drive system and controls the magnitude and direction of current through a magnetic write head 11 represented in the diagram as an inductive coil $L_H$. Prior art magnetic write circuit 10 includes switching transistors M1–M4, current generators I1 and I2, input signal circuit nodes WDX and WDY, circuit head nodes H1 and H2, and voltage source nodes V1 and GND.

Switching transistors M1 and M2 are PMOS transistors each having a gate, a source, and a drain. Switching transistors M3 and M4 are NMOS transistors each having a gate, a drain, and a source. Current generators I1 and I2 are each portions of a current mirror circuit used to generate a reference current Iw. Input signal circuit node WDX is connected to the gates of switching transistors M1 and M3, and input signal circuit node WDY is connected to the gates of switching transistors M2 and M4. The sources of switching transistors M1 and M2 are each connected to voltage source node V1, and the drains of switching transistors M1 and M2 are connected respectively to circuit head nodes H1 and H2. Current generator I1 is connected between circuit head node H1 and the drain of switching transistor M3, and current generator I2 is connected between circuit head node H2 and the drain of switching transistor M4. The sources of switching transistors M3 and M4 are each connected to voltage source node GND.

In an initial input signal situation chosen for purposes of description, input signal node WDX has a high voltage (V1) and input signal node WDY has a low voltage (GND), for example. In the steady state in this situation, switching transistors M2 and M3 are turned on and switching transistors M1 and M4 are turned off. The voltages at circuit head nodes H1 and H2 are approximately V1−VSD, as the resistance of inductive coil $L^H$ is low (where VSD is the voltage drop across the source-drain junction of transistor M2). Current Iw is drawn from voltage source node V1, through the source and drain of switching transistor M2, through magnetic write head 11 from head node H2 to H1, through current generator I1, through the drain and source of switching transistor M3, and into voltage source node GND.

When the input signal on nodes WDX and WDY is subsequently changed to then have a high voltage (V1) at input signal node WDY and a low voltage (GND) at input signal node WDX, switching transistors M1 and M4 are turned on and switching transistors M2 and M3 are turned off. This causes the voltage at the drain of switching transistor M1 to initially rise to approximately V1−VSD, and the voltage at the drain of switching transistor M2 to initially drop to approximately VDS+VI2 (where VDS is the voltage drop across the drain-source junction of transistor M4, and VI2 is the voltage drop across current generator I2).

Because the voltage at head node H1 (which is equal to the voltage at the drain of switching transistor M1) is approximately V1−VSD and the voltage at head node H2 (which is equal to the voltage at the drain of switching transistor M2) is approximately VDS+VI2, a voltage drop of approximately V1−VSD−VDS−VI2 volts is initially created across inductive coil $L_H$ from head node H1 to H2. As a result, the current through inductive coil $L_H$ (which, prior to the change at input signal nodes WDX and WDY, was flowing through inductive coil $L_H$ from head node H2 to H1) will follow the change in polarity across inductive coil $L_H$ and ultimately change direction and flow through inductive coil $L_H$ from head node H1 to H2.

After the change in direction of current through inductive coil $L_H$ so that a current approximately equal to Iw now flows from head node H1 to H2, the voltage at head node H2 will begin to rise to nearly the voltage at head node H1. This is because once the direction of the current through inductive coil $L_H$ is established, the rate of change of the current will decrease to nearly zero because the resistance of inductive coil $L_H$ is relatively small. Also, the voltage at head node H1 is held approximately constant because the voltage drop VSD across the source-drain junction of switching transistor M1 (which is turned on) is approximately constant.

Therefore, because switching transistors M1 and M4 are turned on and switching transistors M2 and M3 are turned off with a high voltage at node WDY and a low voltage at node WDX, a current approximately equal to Iw is drawn from voltage source node V1, through the source and drain of switching transistor M1, through magnetic write head I1 from head node H1 to H2, through the drain and source of switching transistor M4, and into voltage source node GND. As described above, a maximum voltage drop of approximately V1−VSD−VDS−VI2 volts is created across inductive coil $L_H$ from head node H1 to H2 at the beginning of the input situation to reverse the direction of current through inductive coil $L_H$.

When the input signal on nodes WDX and WDY is subsequently changed to again have a high voltage (V1) at input signal node WDX and a low voltage (GND) at input signal node WDY as in the initial input signal steady state situation described above, switching transistors M2 and M3 are turned on and switching transistors M1 and M4 are turned off. This causes the voltage at the drain of switching transistor M2 to initially rise to approximately V1−VSD, and the voltage at the drain of switching transistor M1 to initially drop to approximately VDS+VI1 (where VDS is the voltage drop across the drain-source junction of transistor M3, and VI1 is the voltage drop across current generator I1).

Because the voltage at head node H2 (which is equal to the voltage at the drain of switching transistor M2) is approximately V1−VSD and the voltage at head node H1 (which is equal to the voltage at the drain of switching transistor M1) is approximately VDS+VI1, a voltage drop of approximately V1−VSD−VDS−VI1 volts is initially created across inductive coil $L_H$ from head node H2 to H1. As a result, the current through inductive coil $L_H$ (which, prior to the change at input signal nodes WDX and WDY, was flowing through inductive coil $L_H$ from head node H1 to H2) will follow the change in polarity across inductive coil $L_H$ and ultimately change direction and flow through inductive coil $L_H$ from head node H2 to H1.

After the change in direction of current through inductive coil $L_H$ so that a current approximately equal to Iw now flows from head node H2 to H1, the voltage at head node H1 will begin to rise to nearly the voltage at head node H2. This is because once the direction of the current through inductive coil $L_H$ is established, the rate of change of the current will decrease to nearly zero because the resistance of inductive coil $L_H$ is relatively small. Also, the voltage at head node H2 is held approximately constant because the voltage drop VSD across the source-drain junction of switching transistor M2 (which is turned on) is approximately constant.

Therefore, because switching transistors M2 and M3 are turned on and switching transistors M1 and M4 are turned off with a high voltage at node WDY and a low voltage at node WDX, a current approximately equal to Iw is drawn from voltage source node V1, through the source and drain of switching transistor M2, through magnetic write head I1 from head node H2 to H1, through the drain and source of switching transistor M3, and into voltage source node GND. As described above, a maximum voltage drop of approximately V1−VSD−VDS−VI1 volts is created across inductive coil $L_H$ from head node H2 to H1 at the beginning of the input situation to reverse the direction of current through inductive coil $L_H$.

Figure 2:
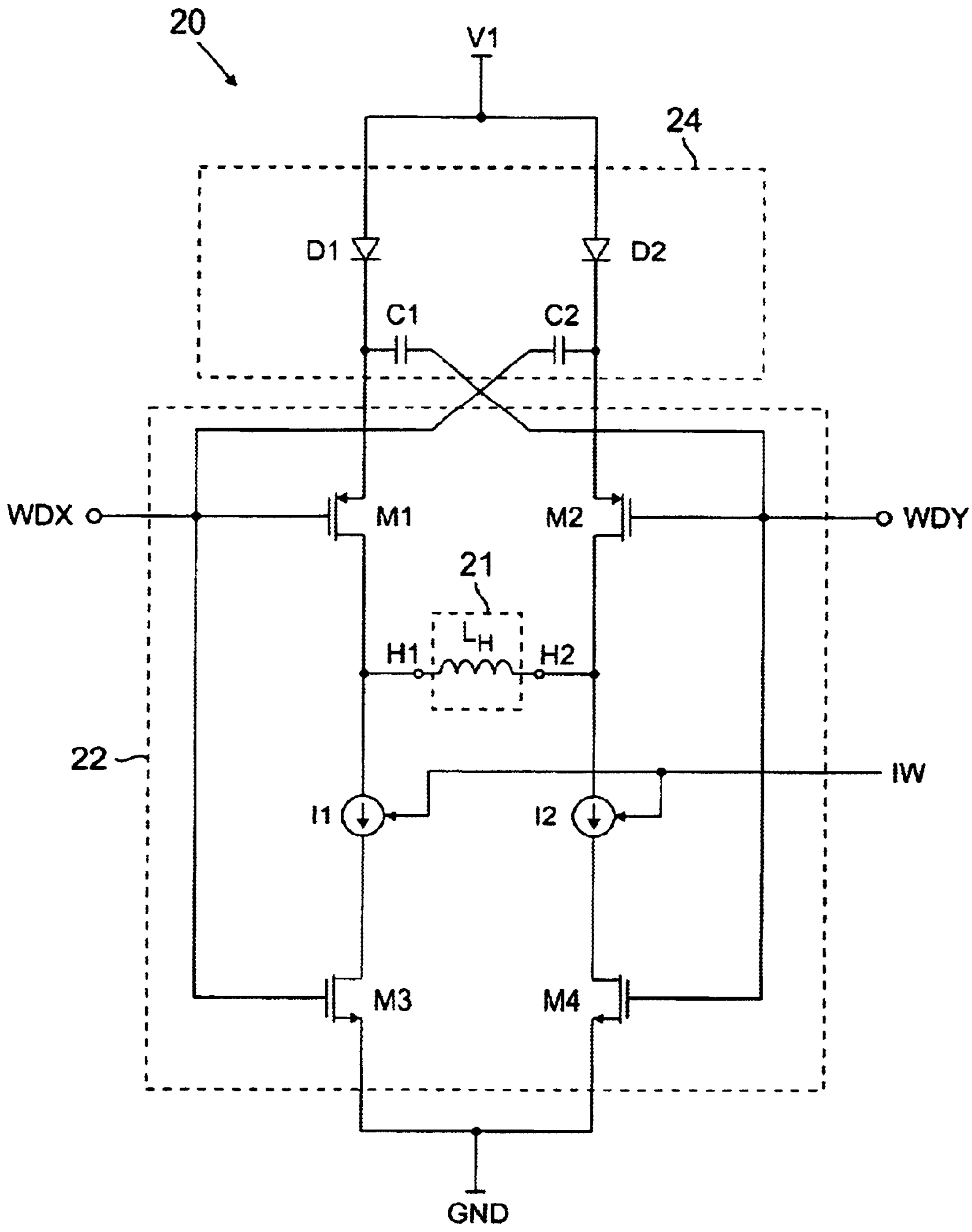
FIG. 2 shows a circuit schematic diagram of a magnetic write circuit embodying the present invention.

FIG. 2 shows a circuit schematic diagram of a magnetic write circuit 20 embodying the present invention. Magnetic write circuit 20 is part of a disk drive system and controls the magnitude and direction of current through a magnetic write head 21 represented in the diagram as an inductive coil $L_H$.

Magnetic write head 21, which is coupled into the remainder of the circuit between circuit head nodes H1 and H2, includes inductive coil $L_H$ along with magnetic material positioned in magnetic fields generated by current therethrough. Magnetic write circuit 20 includes writer circuit 22, charge pumping circuit 24, input signal circuit nodes WDX and WDY, the circuit head nodes H1 and H2 previously mentioned, and voltage source nodes V1 and GND. Magnetic write circuit 20 is preferably fabricated in an integrated circuit.

Writer circuit 22 includes switching transistors M1–M4, and current generators I1 and I2. Switching transistors M1 and M2 are PMOS transistors each having a gate, a source, and a drain. Switching transistors M3 and M4 are NMOS transistors each having a gate, a drain, and a source. Current generators I1 and I2 are each portions of a current mirror circuit used to generate a reference current Iw. Input signal circuit node WDX is connected to the gates of switching transistors M1 and M3, and input signal circuit node WDY is connected to the gates of switching transistors M2 and M4. The drains of switching transistors M1 and M2 are connected respectively to circuit head nodes H1 and H2. Current generator I1 is connected between circuit head node H1 and the drain of switching transistor M3, and current generator I2 is connected between circuit head node H2 and the drain of switching transistor M4. The sources of switching transistors M3 and M4 are each connected to voltage source node GND.

Charge pumping circuit 24 includes capacitors C1 and C2, and diodes D1 and D2. Diodes D1 and D2 each have an anode and a cathode. Capacitor C1 is connected between input signal circuit node WDY and the source of switching transistor M1, and capacitor C2 is connected between input signal circuit node WDX and the source of switching transistor M2. Diode D1 has its anode connected to voltage source node V1 and its cathode connected to the source of switching transistor M1, and diode D2 has its anode connected to voltage source node V1 and its cathode connected to the source of switching transistor M2.

In an initial input signal situation chosen for purposes of description, input signal node WDX has a high voltage (V1) and input signal node WDY has a low voltage (GND), for example. In the steady state in this situation, switching transistors M1 and M4 in writer circuit 22 are turned off, switching transistors M2 and M3 in writer circuit 22 are turned on, and diodes D1 and D2 in charge pumping circuit 24 are turned on. The voltages at circuit head nodes H1 and H2 are approximately V1−VD−VSD, as the resistance of inductive coil $L_H$ is low (where VD is the voltage drop across diode D2 when turned on, and VSD is the voltage drop across the source-drain junction of switching transistor M2). Current Iw is drawn from voltage source node V1, through diode D2, through the source and drain of switching transistor M2, through magnetic recording head 21 from head node H2 to H1, through current generator 11, through the drain and source of switching transistor M3, and into voltage source node GND. In addition, the voltage across capacitor C1 is approximately V1−VD, and the voltage across capacitor C2 is approximately −VD.

When the input signal on nodes WDX and WDY is subsequently changed to then have a high voltage (V1) at input signal node WDY and a low voltage (GND) at input signal node WDX, switching transistors M1 and M4 are turned on, and switching transistors M2 and M3 are turned off. Because the voltage at input signal node WDY is now V1, the voltage at the source of switching transistor MI momentarily becomes approximately 2V1−VD. This is because the voltage-current characteristic of a capacitor is determined by I=Cdv/dt, where I is the current through the capacitor, C is the capacitance of the capacitor, and dv/dt is the rate of change of the voltage across the capacitor. As a result, the voltage across capacitor C1 (which remains V1−VD from the prior input signal situation) cannot instantaneously change (which would produce infinite current) and causes the voltage at the source of switching transistor M1 to momentarily rise to approximately 2V1−VD, and turn diode D1 off. This causes the voltage at the drain of switching transistor M1 to initially rise to approximately 2V1−VD−VSD, and the voltage at the drain of switching transistor M2 to initially drop to approximately VDS+VI2 (where VDS is the voltage drop across the drain-source junction of transistor M4, and VI2 is the voltage drop across current generator I2).

Because the voltage at head node H1 (which is equal to the voltage at the drain of switching transistor M1) is approximately 2V1−VD−VSD and the voltage at head node H2 is approximately VDS+VI2, a voltage drop of approximately 2V1−VD−VSD−VDS−VI2 volts is initially created across inductive coil $L_H$ from head node H1 to H2. As a result, the current through inductive coil $L_H$ (which, prior to the change at input signal nodes WDX and WDY, was flowing through inductive coil $L_H$ from head node H2 to H1) will follow the change in polarity across inductive coil $L_H$ and ultimately change direction and flow through inductive coil $L_H$ from head node H1 to H2.

After switching transistor M1 is turned on and diode D1 is turned off, switching transistor M1 draws current from capacitor C1 and causes capacitor C1 to discharge. As the voltage across capacitor C1 decreases, the voltage at the source of switching transistor M1 will eventually drop to V1−VD. At this point, diode D1 turns on (because the voltage at its cathode is now a VD lower than the voltage at its anode) and switching transistor M1 draws current from voltage source node V1 instead of capacitor C1. In addition, after switching transistor M2 is turned off, capacitor C2 charges up through diode D2 until the voltage across capacitor C2 becomes V1−VD.

After the change in direction of current through inductive coil $L_H$ so that a current approximately equal to Iw now flows from head node H1 to H2, the voltage at head node H2 will begin to rise to nearly the voltage at head node H1. This is because once the direction of the current through inductive coil $L_H$ is established, the rate of change of the current will decrease to nearly zero because the resistance of inductive coil $L_H$ is relatively small. Also, the voltage at head node H1 is held approximately constant because the voltage drop VSD across the source-drain junction of switching transistor M1 (which is turned on) is approximately constant.

Therefore, because switching transistors M1 and M4 are turned on and switching transistors M2 and M3 are turned off with a high voltage at node WDY and a low voltage at node WDX, a current approximately equal to Iw is drawn from voltage source node V1, through diode D1, through the source and drain of switching transistor M1, through magnetic write head 21 from head node H1 to H2, through the drain and source of switching transistor M4, and into voltage source node GND. In addition, the voltage across capacitor C1 is approximately −VD, and the voltage across capacitor C2 is approximately V1−VD. As described above, a maximum voltage drop of approximately 2V1−VD−VSD−VDS−VI2 volts is initially created across inductive coil $L_H$ from head node H1 to H2 at the beginning of the input situation to reverse the direction of current through inductive coils.

When the input signal on nodes WDX and WDY is subsequently changed to again have a high voltage (V1) at input signal node WDX and a low voltage (GND) at input signal node WDY as in the initial input signal steady state situation described above, switching transistors M2 and M3 are turned on, and switching transistors M1 and M4 are turned off. Because the voltage at input signal node WDX is now V1 and the voltage across capacitor C2 remains V1−VD from the prior input signal situation, the voltage at the source of switching transistor M2 momentarily becomes approximately 2V1−VD, and turns diode D2 off. This causes the voltage at the drain of switching transistor M2 to initially rise to approximately 2V1−VD−VSD, and the voltage at the drain of switching transistor M1 to initially drop to approximately VDS+VI1 (where VDS is the voltage drop across the drain-source junction of transistor M3, and VI1 is the voltage drop across current generator I1).

Because the voltage at head node H2 (which is equal to the voltage at the drain of switching transistor M2) is approximately 2V1−VD−VSD and the voltage at head node H1 is approximately VDS+VI1, a voltage drop of approximately 2V1−VD−VSD−VDS−VI1 volts is initially created across inductive coil $L_H$ from head node H2 to H1. As a result, the current through inductive coil $L_H$ (which, prior to the change at input signal nodes WDX and WDY, was flowing through inductive coil $L_H$ from head node H1 to H2) will follow the change in polarity across inductive coil $L_H$ and ultimately change direction and flow through inductive coil $L_H$ from head node H2 to H1.

After switching transistor M2 is turned on and diode D2 is turned off, switching transistor M2 draws current from capacitor C2 and causes capacitor C2 to discharge. As the voltage across capacitor C2 decreases, the voltage at the source of switching transistor M2 will eventually drop to V1−VD. At this point, diode D2 turns on (because the voltage at its cathode is now a VD lower than the voltage at its anode) and switching transistor M2 draws current from voltage source node V1 instead of capacitor C2. In addition, after switching transistor M1 is turned off, capacitor C1 charges up through diode D1 until the voltage across capacitor C1 becomes V1−VD.

After the change in direction of current through inductive coil $L_H$ so that a current approximately equal to Iw now flows from head node H2 to H1, the voltage at head node H1 will begin to rise to nearly the voltage at head node H2. This is because once the direction of the current through inductive coil $L_H$ is established, the rate of change of the current will decrease to nearly zero because the resistance of inductive coil $L_H$ is relatively small. Also, the voltage at head node H2 is held approximately constant because the voltage drop VSD across the source-drain junction of switching transistor M2 (which is turned on) is approximately constant.

Therefore, because switching transistors M2 and M3 are turned on and switching transistors M1 and M4 are turned off with a high voltage at node WDX and a low voltage at node WDY, a current approximately equal to Iw is drawn from voltage source node V1, through diode D2, through the source and drain of switching transistor M2, through magnetic write head 21 from head node H2 to H1, through the drain and source of switching transistor M3, and into voltage source node GND. In addition, the voltage across capacitor C1 is approximately V1−VD, and the voltage across capacitor C2 is approximately −VD. As described above, a maximum voltage drop of approximately 2V1−VD−VSD−VDS−VI1 volts is initially created across inductive coil $L_H$ from head node H2 to H1 at the beginning of the input situation to reverse the direction of current through inductive coil $L_H$.

Figure 3:
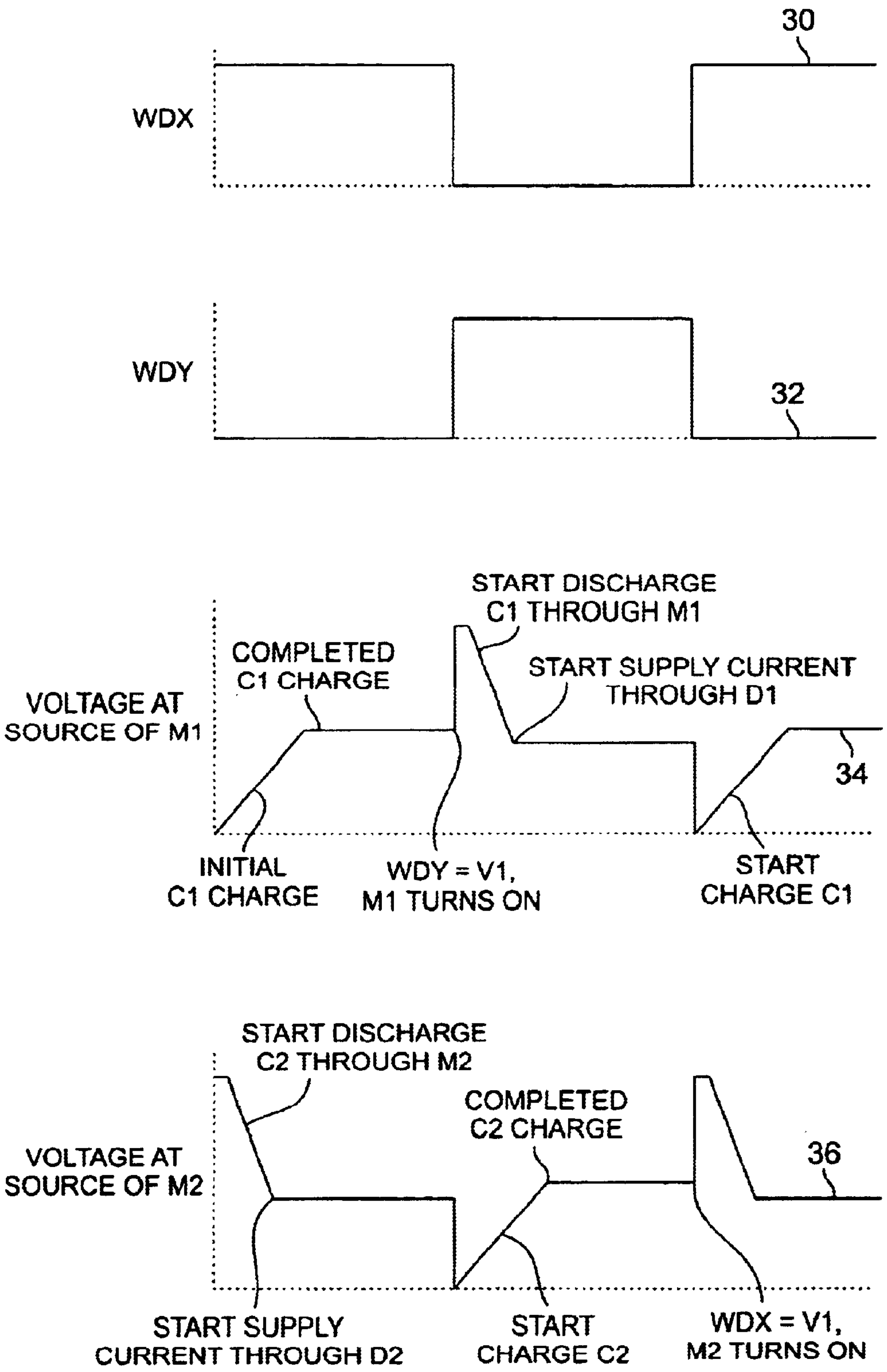
FIG. 3 shows a timing diagram of a magnetic write circuit embodying the present invention.

FIG. 3 shows a timing diagram of a magnetic write circuit 20 embodying the present invention. Waveform 30 illustrates the voltage at input signal circuit node WDX. Waveform 32 illustrates the voltage at input signal circuit node WDY. Waveform 34 illustrates the voltage at the source of switching transistor M1. Waveform 36 illustrates the voltage at the source of switching transistor M2.

Waveform 34 shows that when the voltage at input signal node WDX becomes low and the voltage at input signal node WDY becomes high, the voltage at the source of switching transistor M1 initially rises to a maximum level well above V1 and then drops to a steady state level slightly below V1. In addition, waveform 34 shows that when the voltage at input signal node WDX becomes high and the voltage at input signal node WDY becomes low, the voltage at the source of switching transistor M1 initially drops to a minimum level and then rises to a steady state level slightly below V1.

Waveform 36 shows that when the voltage at input signal node WDX becomes high and the voltage at input signal node WDY becomes low, the voltage at the source of switching transistor M2 initially rises to a maximum level well above V1 and then drops to a steady state level slightly below V1. In addition, waveform 36 shows that when the voltage at input signal node WDX becomes low and the voltage at input signal node WDY becomes high, the voltage at the source of switching transistor M2 initially drops to a minimum level and then rises to a steady state level slightly below V1.

In summary, the present invention introduces a magnetic write circuit that maximizes the head swing voltage while minimizing the power consumption of the circuit. By utilizing a charge-pumping circuit, the magnetic write circuit stores energy during a given input situation and delivers energy upon switching to the next input situation to maximize the head swing voltage without increasing the supply voltage to the circuit.

Although the preferred embodiment of the present invention is shown using FET technology, the present invention may also be practiced using bipolar junction transistor technology, the topology being readily derived from the small-signal models associated with the FET embodiment. Workers skilled in the art will recognize that changes may be made in form and detail without departing from the spirit and scope of the invention.

What is claimed is:

1. A disk drive system including a write circuit for controlling current through a magnetic write head, the write circuit comprising:

an H-switch circuit for controlling direction of current through the write head; and a charge-pumping circuit connected to the H-switch circuit for storing energy during a first state of the H-switch circuit, and delivering energy upon switching from the first state to a second state of the H-switch circuit to accelerate a change in direction of current through the write head.

2. The disk drive system of claim 1 wherein the H-switch circuit comprises:

first and second input signal nodes for receiving input signals;

first and second head nodes for connection to the write head;

a first switch having a conduction path between first and second conduction path regions wherein the second conduction path region is connected to the first head node, the first switch further having a control region responsive to control signals for controlling conduction through the conduction path;

a second switch having a conduction path between first and second conduction path regions wherein the second conduction path region is connected to the second head node, the second switch further having a control region responsive to control signals for controlling conduction through the conduction path;

a third switch having a conduction path between first and second conduction path regions which are connected in series between the first head node and a fixed potential, the third switch further having a control region responsive to control signals for controlling conduction through the conduction path; and a fourth switch having a conduction path between first and second conduction path regions which are connected in series between the second head node and the fixed potential, the fourth switch further having a control region responsive to control signals for controlling conduction through the conduction path.

3. The disk drive system of claim 2 wherein the first and second switches are MOS transistors having a source, a drain, and a gate and wherein the source is the first conduction path region, the drain is the second conduction path region, and the gate is the control region.

4. The disk drive system of claim 2 wherein the third and fourth switches are MOS transistors having a drain, a source, and a gate and wherein the drain is the first conduction path region, the source is the second conduction path region, and the gate is the control region.

5. The disk drive system of claim 2 wherein the H-switch circuit further comprises:

a first current generator connected between the first head node and the first conduction path region of the third switch; and a second current generator connected between the second head node and the first conduction path region of the fourth switch.

6. The disk drive system of claim 2 wherein the charge-pumping circuit comprises:

a supply voltage node for connection to a supply voltage;

a first capacitor connected between the second input signal node and the first conduction path region of the first switch;

a second capacitor connected between the first input signal node and the first conduction path region of the second switch;

a first diode having an anode and a cathode wherein the anode is connected to the supply voltage node and the cathode is connected to the first conduction path region of the first switch; and a second diode having an anode and a cathode wherein the anode is connected to the first supply voltage and the cathode is connected to the first conduction path region of the second switch.

7. The disk drive system of claim 1 wherein the charge-pumping circuit includes a capacitor.

8. The disk drive system of claim 1 wherein the H-switch circuit and the charge-pumping circuit are fabricated in an integrated circuit.

9. A write circuit for controlling current through a magnetic write head, the write circuit comprising:

a switch network for controlling direction of current through the write head; and means for storing energy during a first state of the switch network, and delivering energy upon switching from the first state to a second state of the switch network to accelerate a change in direction of current through the write head.

10. The write circuit of claim 9 wherein the switch network comprises:

first and second input signal nodes for receiving input signals;

first and second head nodes for connection to the write head;

a first switch having a conduction path between first and second conduction path regions wherein the second conduction path region is connected to the first head node, the first switch further having a control region responsive to control signals for controlling conduction through the conduction path;

a second switch having a conduction path between first and second conduction path regions wherein the second conduction path region is connected to the second head node, the second switch further having a control region responsive to control signals for controlling conduction through the conduction path;

a third switch having a conduction path between first and second conduction path regions which are connected in series between the first head node and a fixed potential, the third switch further having a control region responsive to control signals for controlling conduction through the conduction path; and a fourth switch having a conduction path between first and second conduction path regions which are connected in series between the second head node and the fixed potential, the fourth switch further having a control region responsive to control signals for controlling conduction through the conduction path.

11. The write circuit of claim 10 wherein the first and second switches are MOS transistors having a source, a drain, and a gate and wherein the source is the first conduction path region, the drain is the second conduction path region, and the gate is the control region.

12. The write circuit of claim 10 wherein the third and fourth switches are MOS transistors having a drain, a source, and a gate and wherein the drain is the first conduction path region, the source is the second conduction path region, and the gate is the control region.

13. The write circuit of claim 10 wherein the H-switch circuit further comprises:

a first current generator connected between the first head node and the first conduction path region of the third switch; and a second current generator connected between the second head node and the first conduction path region of the fourth switch.

14. The write circuit of claim 10 wherein the means for storing energy and delivering energy comprises:

a supply voltage node for connection to a supply voltage;

a first capacitor connected between the second input signal node and the first conduction path region of the first switch;

a second capacitor connected between the first input signal node and the first conduction path region of the second switch;

a first diode having an anode and a cathode wherein the anode is connected to the supply voltage node and the cathode is connected to the first conduction path region of the first switch; and a second diode having an anode and a cathode wherein the anode is connected to the first supply voltage and the cathode is connected to the first conduction path region of the second switch.

15. The write circuit of claim 9 wherein the means for storing energy and delivering energy includes a capacitor circuit.

16. The write circuit of claim 9 wherein the switch network and the means for storing energy and delivering energy are fabricated in an integrated circuit.

* * * * *

UNITED STATES PATENT AND TRADEMARK OFFICE
CERTIFICATE OF CORRECTION

PATENT NO. : 6,650,494 B2
DATED : November 18, 2003
INVENTOR(S) : Jong K. Kim

It is certified that error appears in the above-identified patent and that said Letters Patent is hereby corrected as shown below:

Column 3,
Line 22, delete "$L^H$" and insert -- $L_H$ --

Signed and Sealed this

Thirteenth Day of January, 2004

JON W. DUDAS
*Acting Director of the United States Patent and Trademark Office*